(No Model.)

P. BROTHERHOOD.
COUPLING FOR SHAFTING.

No. 293,141. Patented Feb. 5, 1884.

Witnesses
A. A. Connolly
W. C. Chaffee

Inventor
Peter Brotherhood
by
Connolly Bro
Atty.

UNITED STATES PATENT OFFICE.

PETER BROTHERHOOD, OF LAMBETH, COUNTY OF SURREY, ENGLAND.

COUPLING FOR SHAFTING.

SPECIFICATION forming part of Letters Patent No. 293,141, dated February 5, 1884.

Application filed November 19, 1883. (No model.) Patented in England October 17, 1883, No. 4,943.

*To all whom it may concern:*

Be it known that I, PETER BROTHERHOOD, a citizen of England, residing at Lambeth, in the county of Surrey, England, have invented a new or Improved Coupling for Shafting, (for which I have obtained provisional protection in Great Britain, No. 4,943, dated October 17, 1883,) of which the following is a specification.

Figure 1:
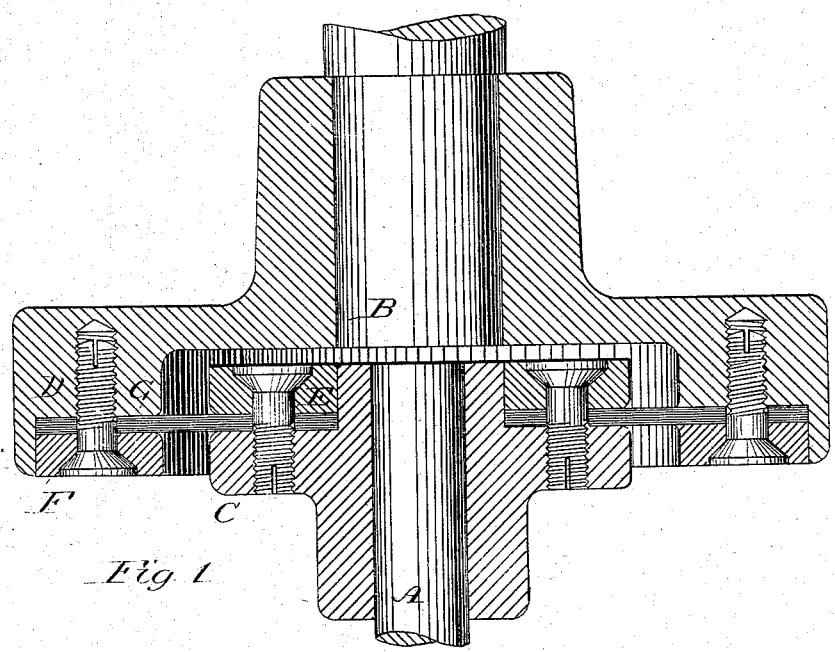
Figure 2:
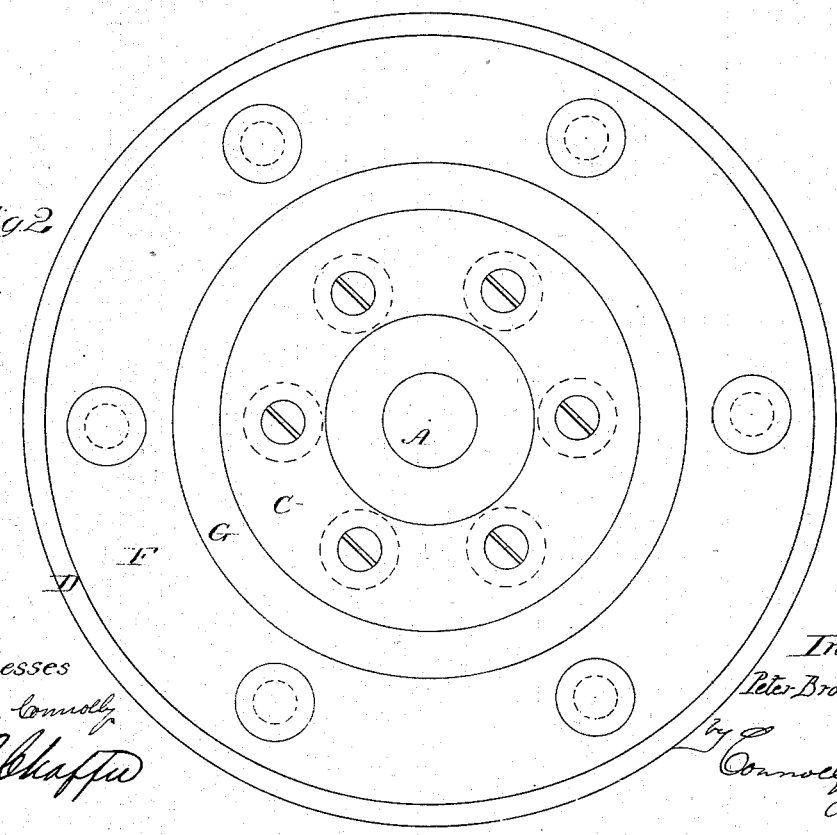

My invention relates to means of coupling two lines of revolving shafting together, so as to allow for error of alignment and give certain freedom for end-play, and also certain elasticity of driving. For this purpose I construct the coupling as shown in section at Figure 1, and in front view, Fig. 2, in the accompanying drawings.

A is part of the one line of shafting, and B is part of the other. On A, I fix a boss with a flange, C, and on B, I fix a boss also, with a flange, D, and by means of two rings, E and F, secured or bolted, respectively, to C and D, I clamp a diaphragm, G, of leather, caoutchouc, or other somewhat flexible and elastic material, a free annulus of which between the two sets of flanges can bend and spring a little, so as to allow for obliquity or end-play of the shafts, and also to convey the driving strain elastically from the one shaft to the other.

The diaphragm G might obviously be made in several thicknesses, and when it is required to be of large size, it might be made in segments, and there might be several layers of such segments breaking joint and secured together by riveting, lacing, or otherwise.

Having thus described the nature of my invention and the best means I know of carrying it into practical effect, I claim—

A coupling for connecting two lines of shafting, consisting of a diaphragm of flexible material clamped by its periphery to the one shaft and by its middle to the other shaft, substantially as herein described.

In testimony whereof I have signed my name to this specification, in the presence of two subscribing witnesses, this 27th day of October, A. D. 1883.

PETER BROTHERHOOD.

Witnesses:
   JOHN DEAN,
   PERCY R. GOLDRING,
     *Both of* 17 *Gracechurch Street, London.*